US009664561B2

(12) United States Patent
Varghese et al.

(10) Patent No.: US 9,664,561 B2
(45) Date of Patent: May 30, 2017

(54) TECHNIQUE TO DISCRIMINATE AGAINST AMBIENT AND SCATTERED LASER LIGHT IN RAMAN SPECTROMETRY

(71) Applicant: The Board of Regents of The University of Texas System, Austin, TX (US)

(72) Inventors: Philip Varghese, Austin, TX (US); Manfred Fink, Austin, TX (US)

(73) Assignee: Board of Regents of the University of Texas System, Austin, TX (US)

( * ) Notice: Subject to any disclaimer, the term of this patent is extended or adjusted under 35 U.S.C. 154(b) by 0 days.

(21) Appl. No.: 14/896,556

(22) PCT Filed: Jun. 4, 2014

(86) PCT No.: PCT/US2014/040825
§ 371 (c)(1),
(2) Date: Dec. 7, 2015

(87) PCT Pub. No.: WO2014/197548
PCT Pub. Date: Dec. 11, 2014

(65) Prior Publication Data
US 2016/0123806 A1    May 5, 2016

Related U.S. Application Data

(60) Provisional application No. 61/832,403, filed on Jun. 7, 2013.

(51) Int. Cl.
*G01J 3/44* (2006.01)
*G01J 3/02* (2006.01)
*G01J 3/12* (2006.01)

(52) U.S. Cl.
CPC ............ *G01J 3/0205* (2013.01); *G01J 3/0208* (2013.01); *G01J 3/0264* (2013.01); *G01J 3/4412* (2013.01); *G01J 2003/1213* (2013.01)

(58) Field of Classification Search
CPC ......... G01J 3/44; G01N 21/65; G01N 21/636; G01N 2021/653; G02F 1/3536
See application file for complete search history.

(56) References Cited

U.S. PATENT DOCUMENTS

| | | | |
|---|---|---|---|
| 5,946,090 A | 8/1999 | Tashiro et al. | |
| 6,064,897 A * | 5/2000 | Lindberg | A61B 5/14532 356/301 |

(Continued)

FOREIGN PATENT DOCUMENTS

WO    98/59225    12/1998

OTHER PUBLICATIONS

International Search Report/Written Opinion for PCT Application No. PCT/US2014/040825 issued Sep. 16, 2014.

(Continued)

*Primary Examiner* — Kara E Geisel
*Assistant Examiner* — Maurice Smith
(74) *Attorney, Agent, or Firm* — Meyertons, Hood, Kiklin, Kowert & Goetzel, P.C.

(57) ABSTRACT

Raman scattering, while a powerful and versatile technique, relies of the detection of weak signals. Detecting the signal can be difficult if there is interference, especially if the interference comes from scattered stray light of the laser used to generate the Raman signal. Described here is a frequency modulation technique in combination with heterodyne detection that simultaneously rejects interference from ambient light as well as from scattered stray laser light. This provides a means to detect Raman signal and discriminate against scattered light without using an expensive and bulky spectrometer.

12 Claims, 4 Drawing Sheets

(56) References Cited

U.S. PATENT DOCUMENTS

| | | | | |
|---|---|---|---|---|
| 6,151,522 | A * | 11/2000 | Alfano | A61B 5/0075 |
| | | | | 356/301 |
| 6,307,626 | B1 * | 10/2001 | Miles | G01J 3/44 |
| | | | | 356/301 |
| 6,778,269 | B2 * | 8/2004 | Fink | G01J 3/44 |
| | | | | 356/301 |
| 8,111,394 | B1 | 2/2012 | Borysow et al. | |
| 8,373,855 | B2 | 2/2013 | Fink et al. | |
| 2003/0002138 | A1 * | 1/2003 | DeCusatis | H01S 3/302 |
| | | | | 359/334 |
| 2008/0018890 | A1 * | 1/2008 | Maity | G01J 1/44 |
| | | | | 356/301 |
| 2008/0180661 | A1 | 7/2008 | Brown et al. | |
| 2009/0219523 | A1 * | 9/2009 | Morris | G01N 21/474 |
| | | | | 356/300 |
| 2010/0177307 | A1 * | 7/2010 | Rimke | G01J 3/44 |
| | | | | 356/301 |
| 2011/0128538 | A1 * | 6/2011 | Cerullo | G01J 3/44 |
| | | | | 356/301 |
| 2012/0002030 | A1 * | 1/2012 | Kalkbrenner | G02B 21/16 |
| | | | | 348/79 |

OTHER PUBLICATIONS

International Preliminary Report on Patentability for PCT Application No. PCT/US2014/040825 issued Dec. 17, 2015.
Pelletier "Ultraviolet Raman Spectroscopy Using an Atomic Vapor Filter and Incoherent Excitation" Applied Spectroscopy (1992), vol. 46 (3) p. 395-400.
Puppels et al. "Direct Imaging Raman Microscope Based on Tunable Wavelength Excitation and Narrow-Band Emission Detection".

* cited by examiner

TECHNIQUE TO DISCRIMINATE AGAINST AMBIENT AND SCATTERED LASER LIGHT IN RAMAN SPECTROMETRY

BACKGROUND OF THE INVENTION

1. Field of the Invention

The invention generally relates to Raman spectroscopy.

2. Description of the Relevant Art

Raman scattering is a type of inelastic scattering of electromagnetic radiation, such as visible light, discovered in 1928 by Chandrasekhara Raman. When a beam of monochromatic light is passed through a substance some of the radiation will be scattered. Although most of the scattered radiation will be the same as the incident frequency ("Rayleigh" scattering), some will have frequencies above ("anti-Stokes" radiation) and below ("Stokes" radiation) that of the incident beam. This effect is known as Raman scattering and is due to inelastic collisions between photons and molecules that lead to changes in the vibrational and/or rotational energy levels of the molecules. This effect is used in Raman spectroscopy for identifying and investigating the vibrational and rotational energy levels of molecules. Raman spectroscopy is the spectrophotometric detection of the inelastically scattered light.

"Stokes" emissions have lower energies (lower frequencies or a decrease in wave number (cm.sup.−1)) than the incident laser photons and occur when a molecule absorbs incident laser energy and relaxes into an excited rotational and/or vibrational state. Each molecular species will generate a set of characteristic Stokes lines that are displaced from the excitation frequency (Raman shifted) whose intensities are linearly proportional to the density of the species in the sample.

"Anti-Stokes" emissions have higher frequencies than the incident laser photons and occur only when the photon encounters a molecule that, for instance, is initially in a vibrational excited state due to elevated sample temperature. When the final molecular state has lower energy than the initial state, the scattered photon has the energy of the incident photon plus the difference in energy between the molecule's original and final states. Like Stokes emissions, anti-Stokes emissions provide a quantitative fingerprint for the molecule involved in the scattering process. This part of the spectrum is seldom used for analytical purposes since the spectral features are weaker. However, the ratio of the Stokes to the anti-Stokes scattering can be used to determine the sample temperature when it is in thermal equilibrium.

The Stokes and anti-Stokes emissions are collectively referred to as spontaneous Raman emissions. Since the excitation frequency and the frequency of the Stokes (and anti-Stokes) scattered light are typically far off the excitation of any other component in the sample, fluorescence in near infrared (NIR) wavelengths is minimal. The sample is optically thin and will not alter the intensities of the Stokes emissions (no primary or secondary extinctions), in stark contrast to infrared spectroscopy.

Raman spectroscopy is a well-established technology to determine the presence of trace compounds down to very low (e.g. n mol/liter) levels. With Raman analysis, absolute densities can be determined, the sparse spectra minimize interferences, and overtones and combination lines are strongly suppressed.

However, conventional Raman analyzers tend to lack the desired sensitivity, require an extensive integration time, be too large, and/or be too costly for widespread use. Thus, there is a need in the art for a relatively inexpensive, compact Raman spectrometer capable of improved sensitivity and integration times.

SUMMARY OF THE INVENTION

The method proposed herein helps discriminate against parasitic interferences that make Raman signal hard to detect. Raman scattering can be used to detect molecules of interest in a variety of industrial and medical applications.

In conventional Raman spectroscopy one uses a spectrometer to provide spectral resolution for the Raman signal. Interferences appear at different wavelengths from the Raman signal, and provided they are not too strong, they do not swamp it. To obviate the use of a spectrometer one can use optical band pass filters that selectively transmit Raman signals of interest. The problem is that these filters are not perfect and do not completely eliminate ambient light or scattered laser light. Conventionally one discriminates against ambient light interference by modulating the intensity of the laser beam (typically with an optical chopper near the light source). Non-laser based signals are not modulated and so one can suppress them by frequency selective detection electronics. Unfortunately scattered laser light is also intensity modulated and even a small fraction of laser light leaking through optical filters can swamp the weak Raman signal.

Improvements to Raman spectroscopy may be obtained by setting the laser operating wavelength so that the Raman signal is near one of the edges of a band pass filter (conventionally it is centered on the transmission band of the filter). The tuning capability of commonly used solid state lasers sources can then be used to modulate Raman signal in wavelength by modulating the wavelength of the source laser. Heterodyne detection is then used to simultaneously discriminate against interference from ambient light. This also obtains discrimination against interference from scattered laser light. The disclosed technique achieves simultaneous discrimination against ambient light and scattered laser light using components that are already used in typical Raman detection systems. It also obviates the need for optical intensity modulators.

BRIEF DESCRIPTION OF THE DRAWINGS

Advantages of the present invention will become apparent to those skilled in the art with the benefit of the following detailed description of embodiments and upon reference to the accompanying drawings in which.

Figure 1:
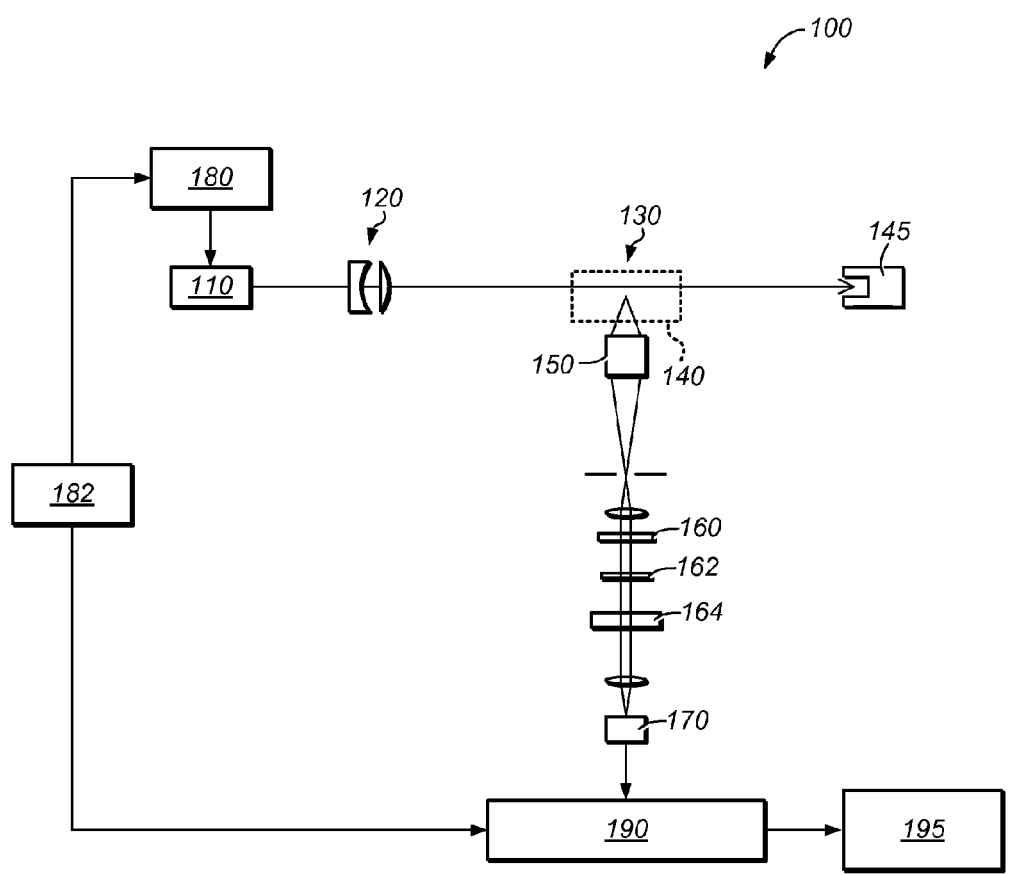
FIG. 1 depicts a schematic diagram of the optical layout of a Raman spectrometer.

While the invention may be susceptible to various modifications and alternative forms, specific embodiments thereof are shown by way of example in the drawings and will herein be described in detail. The drawings may not be to scale. It should be understood, however, that the drawings and detailed description thereto are not intended to limit the invention to the particular form disclosed, but to the contrary, the intention is to cover all modifications, equivalents, and alternatives falling within the spirit and scope of the present invention as defined by the appended claims.

DETAILED DESCRIPTION OF THE PREFERRED EMBODIMENTS

It is to be understood the present invention is not limited to particular devices or methods, which may, of course, vary. It is also to be understood that the terminology used herein is for the purpose of describing particular embodiments only, and is not intended to be limiting. As used in this specification and the appended claims, the singular forms "a", "an", and "the" include singular and plural referents unless the content clearly dictates otherwise. Furthermore, the word "may" is used throughout this application in a permissive sense (i.e., having the potential to, being able to), not in a mandatory sense (i.e., must). The term "include," and derivations thereof, mean "including, but not limited to." The term "coupled" means directly or indirectly connected.

FIG. 1 depicts an optical layout of an embodiment of a Raman spectrometer 100. The spectrometer includes a tunable laser 110 which can be set at the appropriate wavelength for testing. In some embodiments, tunable laser 110 is a diode laser. Light from the laser is directed through standard beam shaping transmission optics 120 to the measurement region 130. In the measurement region, the laser light is directed into a sample 140 disposed in the measurement region. The scattered light is directed into standard signal collection optics 150, while the unscattered light is sent to a beam dump 145.

The scattered light includes the Rayleigh scattered light and the Raman emissions. The scattered light is sent through the laser line rejection filter 160 to remove the Rayleigh scattered light. The Raman light is passed into a band pass filter 162 which is selected for the wavelength of light corresponding to the wavelength of the Raman emission of interest. Use of a band pass filter allows the Raman band of interest to be observed without the need for a spectrometer. Light that passes through the band pass filter is collected by a detector 170 and used to analyze the sample.

In an embodiment, modulation techniques are used to improve the detectability of the weak Raman signals. The Raman spectrometer depicted in FIG. 1 may use wavelength modulated light to improve sensitivity and help discriminate against various interferences typically encountered in Raman spectroscopy. In an embodiment, the tunable laser may be coupled to power source 180 which is coupled to a wavelength modulation control 182. The output frequency of a diode laser varies with injection current, because of changes in the carrier density in the active layer and changes in temperature resulting from Joule heating. However, temperature change is the dominant effect for time scales greater than approximately 1 ms, i.e. changing the injection current is essentially a means of rapidly changing the cavity temperature. The diode laser frequency tunes with temperature because of the change in the optical path length of the cavity between the facets and a change in the index of refraction of the active layer, both resulting in a shift in the lasing mode wavelength. Use of diode lasers in this manner obviates the need for optical intensity modulators. In the embodiment depicted in FIG. 1, wavelength modulation control 182 modulates the current supplied to the laser power source 180 to alter the wavelength of light produced by laser 110.

Raman spectrometer 100 of FIG. 1 also includes heterodyne detection electronics 190 that can analyze the received modulated signal. The analyzed signal is sent to data acquisition/recording equipment 195 for display and recording. Heterodyne detection electronics 190 include a lock-in amplifier that is synchronized with the wavelength modulation control 182. This allows very high levels of background rejection because lock-in is both frequency and phase-selective. The lock-in amplifier is set at an nth harmonic of the modulation frequency of laser 110. When the source laser frequency is modulated by modulating the laser current, the intensity is typically simultaneously modulated at the same frequency. Thus first harmonic detection of the signal may still be sensitive to interference from laser light scatter while eliminating interference from ambient light. However, second (or higher) harmonic detection (2f-nf) provides simultaneous discrimination against interference from ambient light and scattered laser light.

While wavelength modulated analysis improves the detection sensitivity, it does not address the problem of stray light interference. This is because the scattered stray light is modulated at the same frequency as the signal. Further improvements may be obtained by modifying the operating parameters of the system. Typically, the laser operating wavelength is set such that the Raman signal of interest is centered on the transmission band of the band pass filter. We have found that improved discrimination against ambient light and scattered laser light may be achieved by setting the laser operating wavelength so that the Raman signal is near one of the edges of the band pass filter. The Raman signal is dithered and scanned across the edge of the transmission band of the band pass filter. In this manner, scattered light interference may be reduced.

Figure 2:
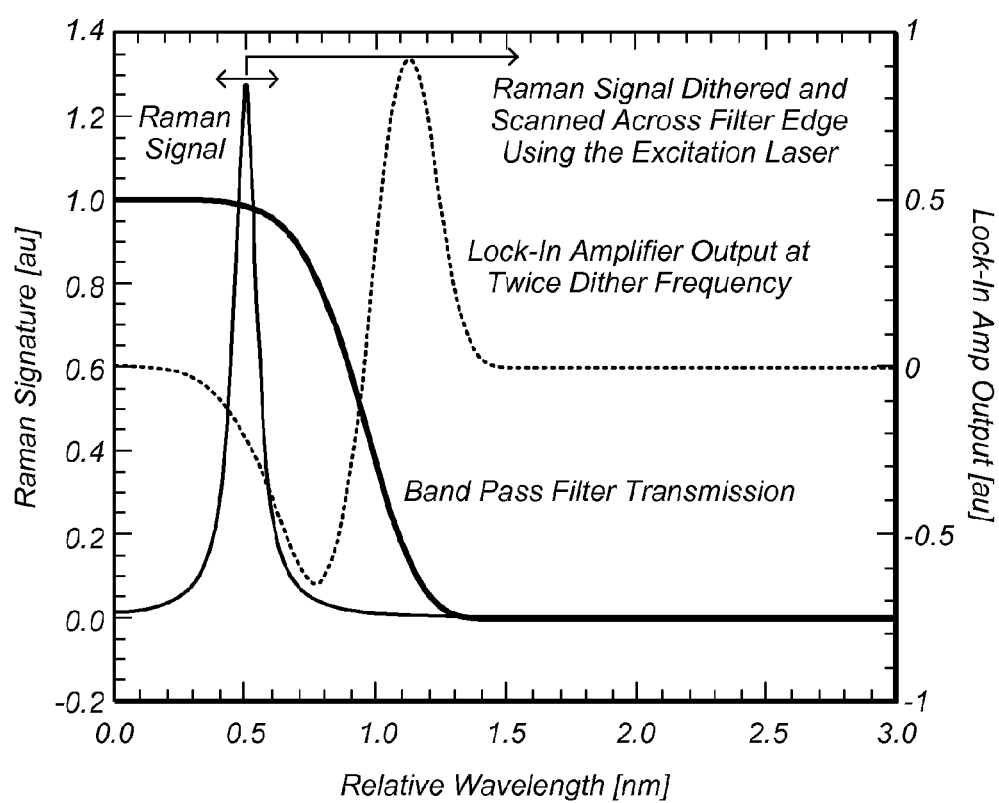
FIG. 2 depicts a schematic diagram of a modulation scheme.

FIG. 2 depicts a schematic diagram of this modulation scheme. FIG. 2 shows a Raman signal that is offset from the center (0) of the transmission band of the band pass filter by 0.5 nm. Thus the Raman signal is moved away from the center toward one of the edges. The Raman signal is then dithered across the filter edge. The lock-in amplifier output is set at twice the dither frequency (2f) In practice one would tune the laser to establish a wavelength that gives the best signal from the lock-in then dither around that wavelength.

Figure 3:
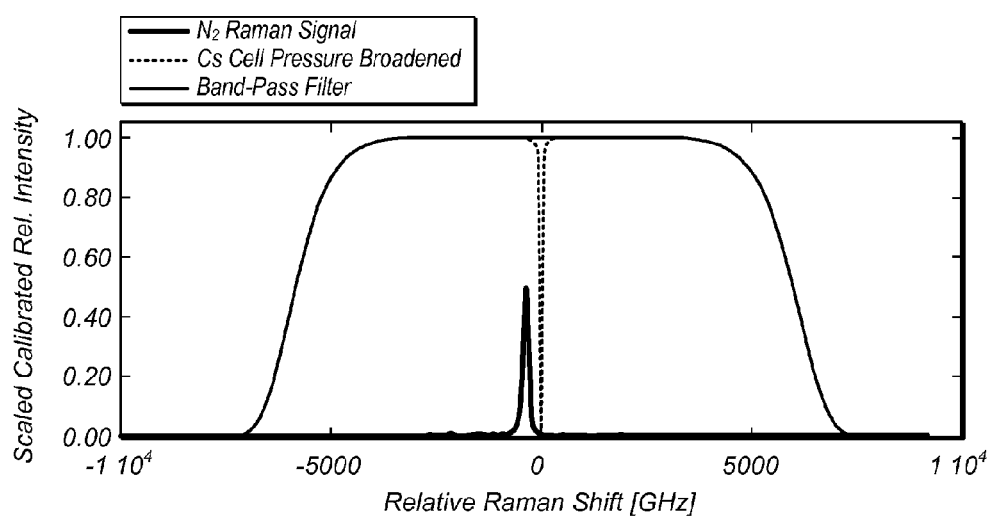
FIG. 3 depicts a comparative graph of the relative widths of a bandpass filter, an atomic vapor filter and a Raman spectrum.

Band pass filters can be custom designed for any wavelength, allowing the spectrometer to be customized to the specific application. This gives much more flexibility in the choice of laser because you can order the filter where the Raman signal for the molecule of interest appears for the laser you choose. One disadvantage of a typical band pass filter is that the laser may have to be modulated over broader range of frequency to get a strong derivative signal. In some instances this range may be outside the normal single mode tuning range of commercially available inexpensive laser systems. In some embodiments, a band pass filter may be replaced by a molecular vapor filter or an atomic vapor filter. FIG. 3 shows the relative widths (expressed in GHz frequency units) of a typical 2 nm wide band-pass filter near 850 nm, a typical room temperature Raman spectrum (from nitrogen gas), and an atomic vapor absorption filter. The atomic filter can be extremely narrow, and, in the example shown in FIG. 3, has been broadened by adding argon gas to the cell. A molecular vapor filter may be comparable in width to the pressure broadened atomic vapor filter. The much narrowed atomic or molecular absorption filters will significantly reduce frequency range needed to get a strong derivative signal.

While atomic and molecular absorption filters have a narrow transmission width, they are only available in selected wavelengths. This would require that the laser wavelength would have to be modified to match the Raman signal to the edge of the existing transmission lines. In an alternate embodiment, an additional narrow band wavelength selective element may be placed between the band pass filter and the detector. In some embodiments a Fabry-Perot etalon (FIG. 1, 164) may be placed in the path of light between band pass filter 162 and detector 170 to provide high selectivity. This may be done instead of relying atomic or molecular absorption filters, and would thus have the advantage of being able to use customized band pass filters for the wavelengths of interest.

Figure 4:
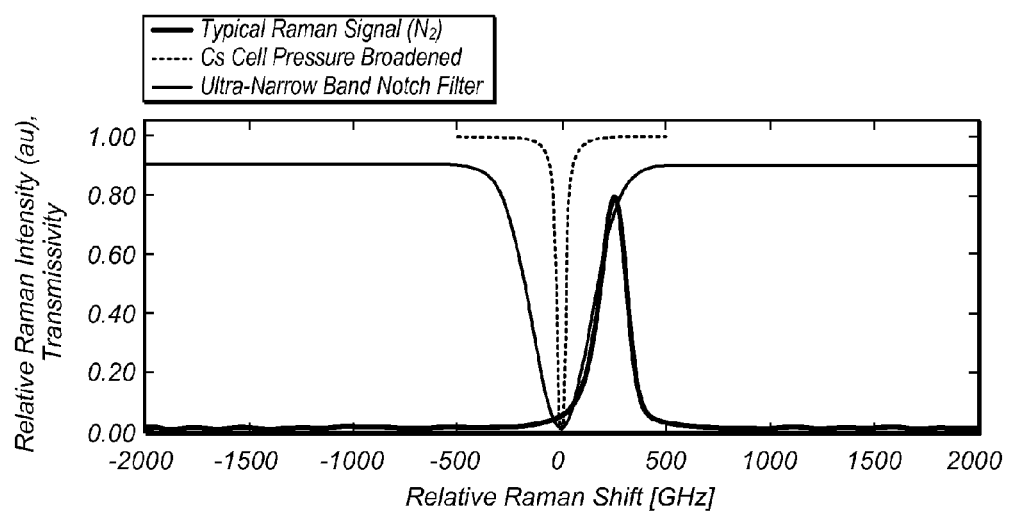
FIG. 4 depicts a comparison of the relative widths of an ultra-narrow band notch filter, a typical room temperature Raman spectrum (from nitrogen gas), and an atomic vapor absorption filter in a cell.

In another embodiment, ultra-narrow band notch filters made with volume holographic gratings may be placed in the path of light between the band pass filter and the detector to provide high selectivity. In such an embodiment, the exciting laser may be set so that the Raman signal is on the edge of the filter. The laser operating frequency may be modulated while using 2f (or higher harmonic) detection as discussed above. Because the filter is so narrow the laser current would not have to be changed too much to get significant modulation and should be within the operating range of most solid state lasers. FIG. 4 depicts a comparison of the relative widths (expressed in $cm^{-1}$ frequency units) of an ultra-narrow band notch filter, a typical room temperature Raman spectrum (from nitrogen gas), and an atomic vapor absorption filter in a cell. FIG. 4 depicts the Raman spectrum and the atomic vapor filter for comparison to the previous transmission filter width which is much broader. The x-axis units can be converted to GHz by multiplying by approximately 30 (more accurately 29.97; this comes from the speed of light).

Other Raman spectrometers are disclosed in the following U.S. patents, each of which is incorporated herein by reference: U.S. Pat. No. 6,778,269 to Fink et al.; U.S. Pat. No. 8,111,394 to Borysow et al.; and U.S. Pat. No. 8,373,855 to Fink et al. By operating these Raman spectrophotometers in the manner described herein, the devices may be improved by reducing interference from scattered laser light.

The above-described Raman spectrophotometer and methods of operating the Raman spectrophotometer has a variety of industrial and medical applications. In addition, this Raman technique could be used for environmental monitoring applications where molecules of interest are detected either in the gas phase or in solution. Possible examples are early earthquake warning systems tied to changes in concentration of key tracer gases in hot springs near earthquake faults. Other applications include monitoring of hydrocarbon and other clathrates near the sea floor in the arctic. There is concern that sea temperature rise due to global climate change could result in catastrophic release of these cltharates. Similarly one could monitor the concentration of nitrate run-off associated with indiscriminate use of fertilizer and establish causal connection to toxic algal blooms in the Gulf of Mexico. All these applications require a network of inexpensive rugged sensors, which can be provided by the system and methods disclosed herein.

In this patent, certain U.S. patents, U.S. patent applications, and other materials (e.g., articles) have been incorporated by reference. The text of such U.S. patents, U.S. patent applications, and other materials is, however, only incorporated by reference to the extent that no conflict exists between such text and the other statements and drawings set forth herein. In the event of such conflict, then any such conflicting text in such incorporated by reference U.S. patents, U.S. patent applications, and other materials is specifically not incorporated by reference in this patent.

Further modifications and alternative embodiments of various aspects of the invention will be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as examples of embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

What is claimed is:

1. A Raman spectrophotometer comprising:
   a tunable laser;
   a measurement region optically coupled to the tunable laser, wherein a sample is disposed in the measurement region;
   a signal collection region optically coupled to the measurement region, wherein the signal collection region collects scattered light from the measurement region;
   a filter optically coupled to the signal collection region, wherein the filter selectively transmits light of a predetermined transmission band;
   a wavelength modulation controller coupled to the laser, wherein the wavelength modulation controller modulates the tunable laser frequency such that a Raman signal generated, during use, moves from within the transmission band of the filter to outside the transmission band; and
   a heterodyne detection system, wherein the heterodyne detection system comprises a lock-in amplifier, electrically coupled to the wavelength modulation controller, wherein the lock-in amplifier is synchronized with the modulation of the tunable laser by the wavelength modulation controller.

2. The system of claim 1, wherein the filter is a band pass filter.

3. The system of claim 1, wherein the filter is a molecular vapor filter.

4. The system of claim 1, wherein the filter is an atomic vapor filter.

5. The system of claim 1, wherein the filter comprises a band pass filter optically coupled to a Fabry-Perot etalon.

6. The system of claim 1, wherein the filter comprises a band pass filter optically coupled to a ultra-narrow band notch filter.

7. A method of detecting the presence of an analyte, comprising:
   placing a sample containing an analyte in a measurement region of a Raman spectrophotometer;
   sending laser light into the sample, wherein the wavelength of the laser light is selected to create Raman signals at a predetermined wavelength;
   modulating the output frequency of the laser light;
   collecting the Raman signals through a filter as the frequency of the laser light is modulated, wherein the filter has a predetermined transmission band, and wherein the wavelength of the laser is selected such that the Raman signal has a wavelength near an end of the transmission band of the filter; and
   determining that an analyte is present by using a heterodyne detection system that is synchronized with the frequency modulation of the tunable laser; and
   wherein modulating the output frequency of the laser light changes the wavelength of the Raman signal, such that the Raman signal moves from within the transmission band of the filter to outside the transmission band of the filter.

8. The method of claim 7, wherein the filter is a band pass filter.

9. The method of claim 7, wherein the filter is an atomic vapor filter.

10. The method of claim 7, wherein the filter is a molecular vapor filter.

11. The method of claim 7, wherein the filter comprises a band pass filter optically coupled to a Fabry-Perot etalon.

12. The method of claim 7, wherein the filter comprises a band pass filter optically coupled to an ultra-narrow band notch filter.

* * * * *